Aug. 2, 1927.　　　T. C. RUSSELL　　　1,637,391
ELECTRIC HEATING STRUCTURE
Filed July 23, 1926　　　2 Sheets-Sheet 1
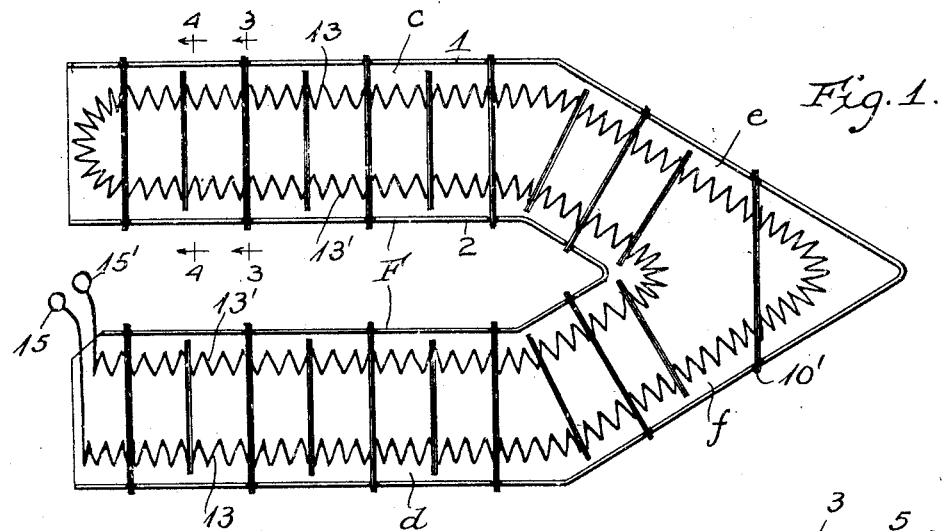
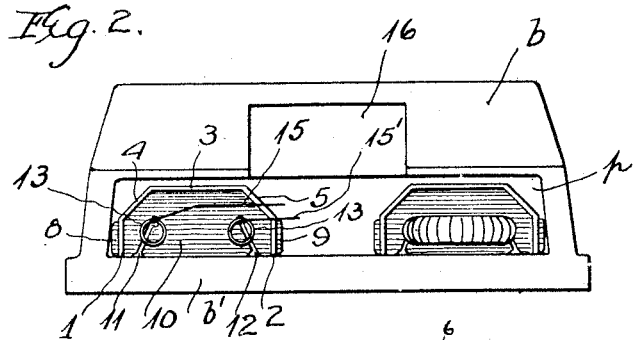
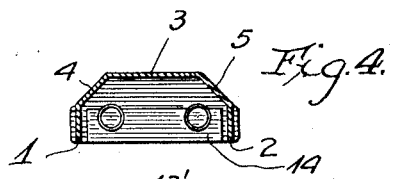
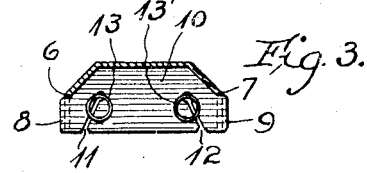
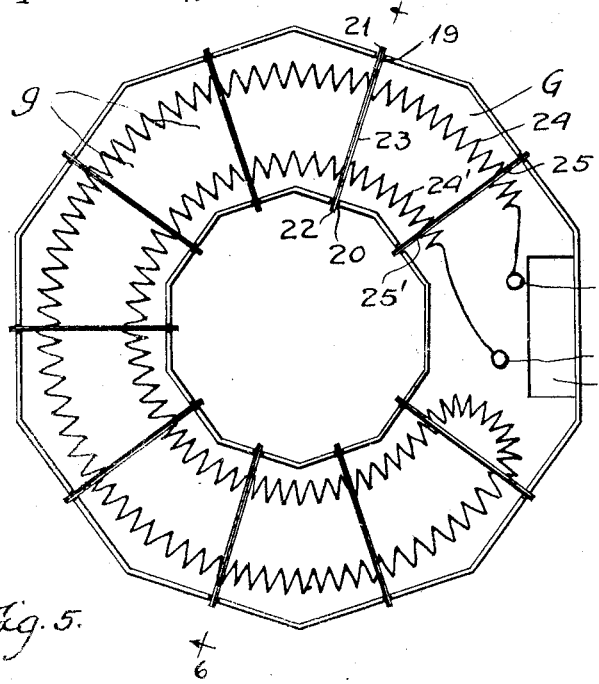
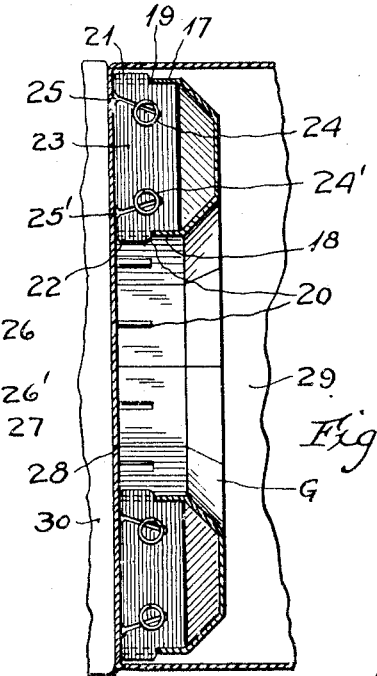
Inventor,
Thomas C. Russell
By Brown, Boettcher, Dienner
Attys.

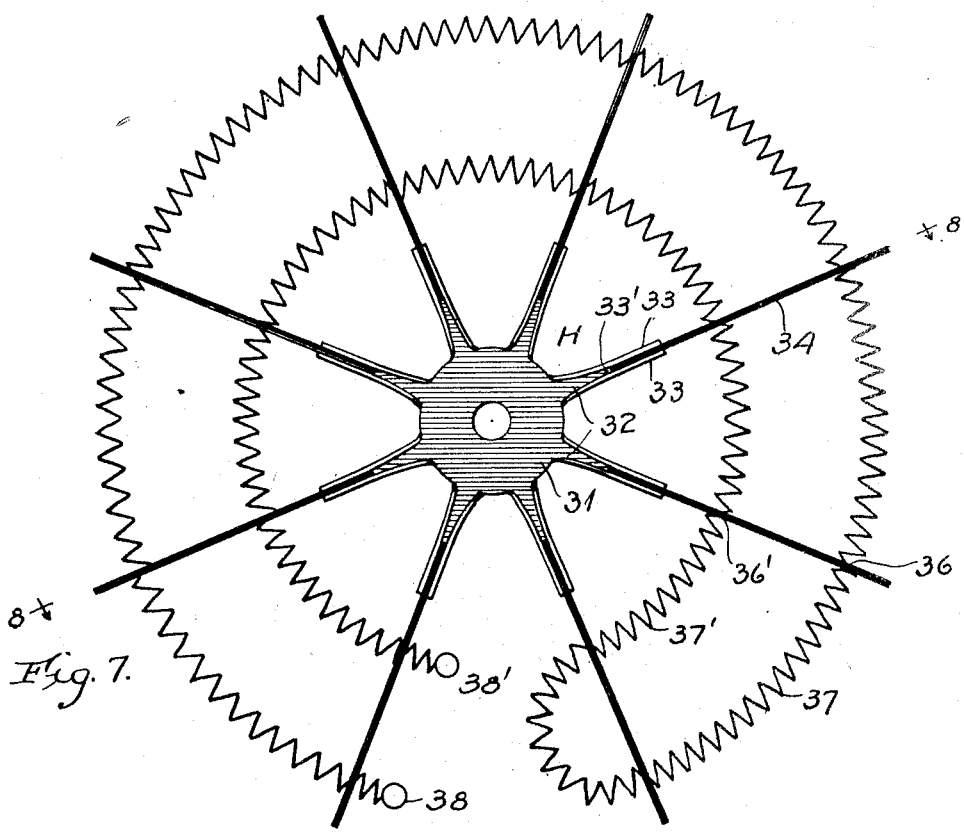
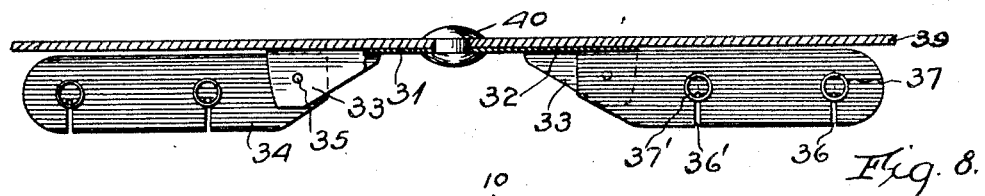
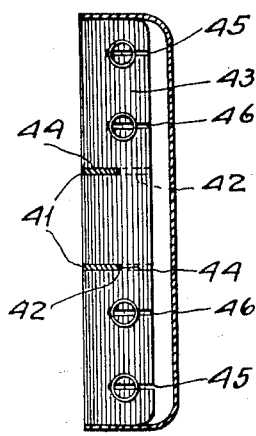
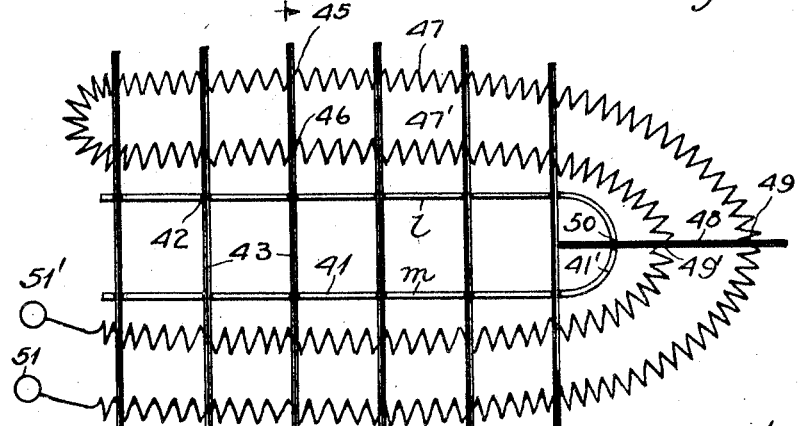

Patented Aug. 2, 1927.

1,637,391

UNITED STATES PATENT OFFICE.

THOMAS C. RUSSELL, OF CHICAGO, ILLINOIS.

ELECTRIC HEATING STRUCTURE.

Application filed July 23, 1926. Serial No. 124,303.

My invention relates to electric heating structures for units to be used in electric flat irons, pots and percolators, waffle irons, and in other electrically heated utensils and devices. The object of the invention is to provide simplified and more efficient support for the electrical resistance conductor of the heating unit and to provide a structure in which the resistance conductor supporting frame will efficiently reflect the radiated heat against the surface to be heated.

On the drawing I have shown the various features of my invention embodied in various heating units, in which, Figure 1 is a bottom view of one form of heating unit for flat irons;

Fig. 2 is a rear elevational view of a flat iron body showing the unit of Figure 1 in place therein;

Fig. 3 is a sectional view on plane 3—3, Figure 1;

Fig. 4 is a sectional view on plane 4—4, Figure 1;

Fig. 5 is a plan view of a heating unit particularly adaptable for heating cylindrical utensils such as percolators or coffee pots;

Fig. 6 is a sectional view on plane 6—6, Figure 5;

Fig. 7 is a plan view of a heating unit particularly adaptable for waffle irons;

Fig. 8 is a sectional view on plane 8—8, Figure 7;

Fig. 9 is a plan view of a modified form of unit adapted particularly for use in flat irons; and Fig. 10 is a sectional view on plane 10—10, Figure 9.

Each form of unit comprises a sheet metal supporting frame and mica bars or plates supported thereon and provided with slits in which the heating element preferably in the form of a helix wire is applied to be thereby secured to the mica bars and insulated from the frame.

In the structure of Figures 1, 2, 3, and 4, the sheet metal frame F is of generally U-shape in plan view and of inverted U-shape cross section, as shown in Figs. 2, 3 and 4. The shape is such that the frame may readily be inserted in the pocket $p$ formed in the body B of a flat iron. As shown the frame F comprises the parallel legs $c$ and $d$, and the diagonal yoke sections $e$ and $f$ which engage in the point of the flat iron body.

In cross section the frame F may be semi-circular or polygonal. As shown it comprises the side walls 1 and 2, the top or back wall 3 and the diagonally extending corner walls 4 and 5. In the side walls are sets of opposed transverse slots 6 and 7 for receiving the ears 8 and 9 on mica plates or bars 10. The inner ends of these bars abut against the diagonal walls 4 and 5 and may abut against the back wall 3 of the frame. Each supporting bar or plate has a set of slits 11 and 12 extending from the outer edge thereof, and inserted in these slits to be thereby secured to the mica plates are the legs or sections 13 and 13' of an electrical resistance conductor here shown as in the form of a wire helix. In order to permit more ready insertion of the resistance conductor the entrance edges of the slits are beveled as shown in Figures 2 and 4.

The mica plates or bars are placed at regular intervals in the sections $c$, $d$, $e$ and $f$ of the frame F and a bar 10' may extend between the outer walls of the sections $e$ and $f$, as shown in Figure 1. The outer edges of the mica bars are flush with the outer edges of the frame so that when the frame is inserted in the flat iron body, as shown in Figure 2, the mica bars will rest with the edges of the frame F against the bottom B' of the flat iron body which bottom is particularly to be heated by the heating unit.

In order to prevent sagging of the electrical conductor between mica bars when the conductor is heated to incandescence, I apply plates 14, preferably of mica, to the conductor legs between the mica bars 10 and these plates 14 are inserted between adjacent turns of the conductor and are thus securely held in place with their outer edges flush with the edges of the frame F so that they will rest against the floor B' of the flat iron body and keep the conductor from sagging into electrical contact with the bottom. In practice the terminals 15 and 15' of the resistance conductor are connected with a terminal structure (not shown) comprising tongues for receiving the sockets of extension cord plugs. As shown in Figure 2 a notch 16 is provided in the flat iron body for accommodating such terminal structure.

The frame F is preferably constructed of a sheet metal which has heat reflecting surface and which will retain such surface under heat. The inner sides of the wall sections 3, 4 and 5 of the frame will then reflect against the surface to be heated the heat generated and radiated from the resistance conductor. The mica bars 10 and the spacer plates 14 will keep the resistance conductor properly aligned within the frame when it is highly heated and will keep it insulated from the frame and flat iron body. The slits 11 and 12 in the mica bars may extend diagonally as shown and with this arrangement the resistance conductor cannot accidentally become displaced from its support in the bars.

In the structure of Figures 5 and 6 the frame G is of generally annular form in plan view and may be circular or oval, or more or less polygonal as shown. The form shown has the ten polygonal sides or sections $g$ and in the opposed outer and inner walls 17 and 18 of each section are the transverse slots 19 and 20 which receive the ears 21 and 22 of a mica bar or plate 23. The legs 24 and 24' of the resistance conductors are secured in the slits 25 and 25' in the mica supports, and the conductor terminals 26 and 26' connect with a terminal structure (not shown) for which clearance space 27 is provided in the frame G. The heating unit is placed with its open end against the wall 28 of a frame 29 which may be part of a cooking utensil 30 such as a coffee pot or percolator. The heat generated by the resistance conductor will then be reflected by the inner surfaces of the frame against the wall 28.

In the general arrangement of Figures 1 to 6, the resistance conductor supporting mica walls are supported at their ends in a sheet metal frame. In the general arrangement of Figures 7 to 10 mica bars or walls are secured at one end or intermediate their ends to a sheet metal frame with their free ends supporting the resistance conductor. The structure shown in Figures 7 and 8 is particularly adaptable for use in devices such as electric waffle irons. The frame H is in the form of a spider comprising the flat central body part 31 and the arms 32 radiating therefrom. The spider frame is formed integral of sheet metal and sections 32' of metal bent up and toward each other strengthen the arms and form seating and retaining pockets 33 for the mica supporting bars 34. The inner ends of the bars are inserted in the pockets 33 and are secured as, for example, by means of prick punching indicated at 35. Each mica bar has a pair of slots 36 and 36' for receiving the sections 37 and 37' of a resistance conductor whose terminals 38 and 38' at one of the bars are adapted for connection with a source of current supply. The unit is applied against a wall 39 to be heated and this wall may be the baking wall of a waffle iron section. The spider is applied with its back against the wall and with the rear edges of the mica bars against or close to the wall and the structure may be secured as by means of a rivet 40, The structure of Figs. 9 and 10 is adaptable for insertion into a flat iron body in substantially the same manner as shown in connection with the heating unit of Fig. 1. In the modified arrangement of Figs. 9 and 10, the unit comprises a U-shape metal frame 41 having in its opposed legs $l$ and $m$ the vertical slots 42 which extend downwardly substantially half the height of the frame. Mica bars 43 have slots 44 registering with the slots 42 of the frame and the mica bar slots receive the legs $l$ and $m$ of the frame 41 and the frame slots 42 receive the mica bars so that the bars will be securely interlocked with the frame as indicated and with the outer ends of the bars extending beyond the frame sides where they are provided with outer and inner slits 45 and 46 for receiving the outer and inner legs 47' of the resistance conductor. To support the sections of the resistance conductor which are to heat the point of the flat iron a mica bar 48 is provided having the outer and inner slits 49 and 49' for receiving the conductor sections and this bar is supported by an interslot connection indicated at 50 which is the same as the interslot connection between the bars 43 and the sides of the frame 41, the interslot connection 50 being in the bend 41' of the frame 41. Instead of only the one bar 48 shown there may be a number of such bars provided for supporting the point heating sections of the resistance conductor. The terminals 51, 51' of the resistance conductor are adapted for connection with a suitable terminal structure (not shown).

The heating structure of Figures 9 and 10 may be inserted into the body of a flat iron and in order to localize and intensify the delivered heat a reflector frame 52 may be applied around the outside of the structure to reflect the generated heat against the surface to be heated as, for example, the ironing wall of the flat iron.

My improved supporting arrangement eliminates the need of special sheet metal reinforcement for the mica supporting bars, the frame structures giving ample support and rigidity to the bars so that the resistance conductor will be securely and safely supported.

Having described my invention I claim as follows:—

1. In an electric heating structure, the combination of a sheet metal supporting frame having slots cut in from its edges, bars of electrical insulating and heat resistant material set in said slots to be thereby supported, said bars having slits extending inwardly from their side edges, and a resistance conductor in the form of a wire helix engaged in said slits to be thereby supported and insulated from said frame.

2. In an electric heating structure, the combination of a sheet metal supporting frame having slots cut in from its edges, mica bars set in said slots to be thereby supported, said bars having slits extending inwardly from their side edges, and a resistance element in the form of a helical wire engaged in said slits to be thereby supported and insulated from said frame, said bars being the sole supports for said resistance element.

3. In an electric heating structure, the combination of a sheet metal supporting frame having side walls provided with slots cut in from the edges thereof, mica bars extending between said walls, said walls having slots for receiving the ends of said bars thereby to support said bars, said bars having slits extending inwardly from their side edges, and a heating element engaged in said slits to be thereby supported and insulated from said frame, said bars forming the sole support for said heating element.

4. In an electric heating structure, the combination of a sheet metal supporting frame having slots cut in from its edges, bars of electrical insulating and heat resistant material set in said slots to be thereby supported, said bars having slits extending inwardly from their side edges, and a resistance conductor in the form of a wire helix engaged in said slits to be thereby supported and insulated from said frame, said supporting frame having a reflecting surface for reflecting the heat generated by said resistance conductor.

5. In an electric heating structure, the combination of a sheet metal frame of substantially U-shape cross section, the side walls of said frame being slotted inwardly from their edges, mica bars extending between said walls and seated in said slots in planes at right angles with the back wall of said frame, transverse slits in said bars, and a resistance wire engaging in said slits to be thereby supported and insulated from said frame, the inner surface of the back wall of said frame being adapted to reflect the heat generated by said wire.

6. In an electric heating structure, the combination of a sheet metal frame of substantially U-shape cross section, the side walls of said frame being slotted inwardly from their edges, mica bars extending between said walls and seated at their ends in said slots in planes at right angles with the back wall of said frame, said bars being transversely slitted a distance inwardly from the outer edges thereof, and an electric resistance conductor between said walls threading through said slits to be thereby supported and insulated from said frame.

7. In an electric heating structure, the combination of a sheet metal supporting frame having slots cut in from its edges, mica bars set in said slots to be thereby supported, said bars having slits extending inwardly from their side edges, a resistance conductor in the form of a wire helix engaged in said slits to be thereby supported, and mica plates clamped by the turns of said conductor and disposed between said bars to assist said bars in insulating said conductor from said frame.

8. In combination, a surface to be heated, a sheet metal supporting frame of substantially U-shape cross section secured with the outer edges of its side walls against said surface, said side walls being slotted inwardly from their outer edges, mica bars extending between said side walls and seated at their ends in said slots in planes at right angles with said surface, said bars being slitted inwardly from their outer edges, a heating element in the form of a helical wire disposed in said slits to be thereby supported and insulated from said frame and surface, and mica plates clamped between the turns of said heating element and disposed between said bars for preventing sagging of said heating element when heated.

9. In combination, a surface to be heated, a sheet metal supporting frame of substantially U-shape cross section secured with the outer edges of its side walls against said surface, said side walls being slotted inwardly from their outer edges, mica bars extending between said side walls and seated at their ends in said slots in planes at right angles with said surface, said bars being slitted inwardly from their outer edges, a heating element in the form of a helical wire disposed in said slits to be thereby supported and insulated from said frame and surface, and mica plates clamped between the turns of said heating element and disposed between said bars for preventing sagging of said heating element when heated, the inner side of said frame being bright whereby to reflect the heat of said heating element against said surface.

10. In an electric heating structure, the combination of a sheet metal supporting frame having slots, mica bars secured in said slots and supported solely thereby, said bars having slits extending from their edges, and a resistance conductor in the form of a wire helix engaged in said slits to be thereby supported by said bars.

11. In an electrical heating structure, the combination of a sheet metal supporting frame having slots, bars of heat refractory and electrically resistant material secured in slots in said frame and extending radially, said bars having slits extending from their edges, and an electrical resistance conductor in the form of a wire helix inserted in said slits to be supported by said bars.

In witness whereof, I hereunto subscribe my name this 16th day of July, 1926.

THOMAS C. RUSSELL.